United States Patent
Li et al.

(10) Patent No.: US 7,361,893 B1
(45) Date of Patent: Apr. 22, 2008

(54) IN SITU SCANNING TUNNELING MICROSCOPE TIP TREATMENT DEVICE FOR SPIN POLARIZATION IMAGING

(75) Inventors: An-Ping Li, Oak Ridge, TN (US); Jianxing Ma, Oak Ridge, TN (US); Jian Shen, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 237 days.

(21) Appl. No.: 11/240,261

(22) Filed: Sep. 30, 2005

(51) Int. Cl.
*G01N 23/00* (2006.01)
(52) U.S. Cl. .................. 250/306; 977/840; 977/849; 977/852
(58) Field of Classification Search .............. 250/306; 977/840, 849, 852
See application file for complete search history.

(56) References Cited

U.S. PATENT DOCUMENTS

| | | | |
|---|---|---|---|
| 5,689,494 A * | 11/1997 | Ichikawa et al. ........... | 369/126 |
| 2006/0071662 A1* | 4/2006 | Xiang et al. ................ | 324/316 |
| 2007/0029480 A1* | 2/2007 | Ding et al. ................. | 250/311 |

FOREIGN PATENT DOCUMENTS

JP          05018706 A  *  1/1993

OTHER PUBLICATIONS

Scholz, et al. "Low thermal power electron beam annealing of scanning tunneling microscope tips" Rev. Sci. Instrum. 68 (8) Aug. 1997.*
Schlickum, et al. "Spin-polarized scanning tunneling microscope for imaging the in-plane magnetization" Appl. Phys. Lett. 83 (10) Sep. 2003.*
A. Kubetzka, et al., "Spin-Polarized Scanning Tunneling Microscopy with Antiferromagnetic probe Tips," Phys. Rev. Lett., 2002, pp. 057201, vol. 88.
O. Pietsch, et al., "Recent Advances in Spin-Polarized Scanning Tunneling Microscopy," Appl. Phys. A., 2004, pp. 781-785, vol. 78.

* cited by examiner

*Primary Examiner*—Jack I. Berman
*Assistant Examiner*—Michael Maskell
(74) *Attorney, Agent, or Firm*—Edna Gergel; James M. Spicer

(57) ABSTRACT

A tip treatment device for use in an ultrahigh vacuum in situ scanning tunneling microscope (STM). The device provides spin polarization functionality to new or existing variable temperature STM systems. The tip treatment device readily converts a conventional STM to a spin-polarized tip, and thereby converts a standard STM system into a spin-polarized STM system. The tip treatment device also has functions of tip cleaning and tip flashing a STM tip to high temperature (>2000° C.) in an extremely localized fashion. Tip coating functions can also be carried out, providing the tip sharp end with monolayers of coating materials including magnetic films. The device is also fully compatible with ultrahigh vacuum sample transfer setups.

3 Claims, 5 Drawing Sheets

IN SITU SCANNING TUNNELING MICROSCOPE TIP TREATMENT DEVICE FOR SPIN POLARIZATION IMAGING

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

1. Field of the Invention

The invention relates to scanning tunneling microscopes (STM), and more particularly to an easily removable STM tip treatment attachment for a scanning tunneling microscope that readily converts the STM to a spin polarization STM (SP-STM).

2. Description of the Prior Art

The scanning tunneling microscope (STM) has revolutionized the field of surface science, and a new field of nanotechnology has developed in which the STM is used as a primary tool for nanofabrication and characterization of nanoscale materials and structures. In a STM system, an atomically sharp wire tip is positioned by piezoelectric actuators above the surface of an electrically conductive sample. When the tip/sample distance is sufficiently small, typically 5-15 angstroms, the application of a small voltage between the tip and the sample leads to a quantum mechanical tunneling current. This tunneling current decays exponentially with increasing tip/sample distance by about one order of magnitude per angstrom. Accordingly, the current is localized to the apex of the tip where tip and sample are the closest. In one use of a STM, if the tunneling current is maintained constant while scanning the tip above the sample surface, the surface topography can be imaged with atomic resolution.

STM users have long wanted to detect the local magnetization of the surface below the apex of a STM tip. This would be done by making the tip sensitive to the spin polarization of the tunneling electrons, thereby imaging the magnetic domain structure of the sample with ultimate resolution down to the atomic scale. In order to realize a spin-polarization STM (SP-STM), the STM tip must be made of a magnetic material that exhibits an intrinsic spin polarization close to the Fermi level.

Substantial progress toward spin-polarization STM has been made over the last fifteen years (Ref 1). However, it is still carried out with difficulty. Only a very few groups have succeeded in adding a spin polarization function to their STM systems at all. For those groups that have succeeded, the main problem continues to be that major modifications to the existing STM system are required, and as a result, the system becomes more limited, almost wholly dedicated to SP-STM alone. This means a consequent lack of versatility and compatibility for other needed tasks in STM systems that have been modified for spin-polarization STM.

An ideal wire tip for SP-STM must possess a good signal-to-noise ratio that can only be achieved if the apex atom exhibits a high spin polarization. Since the presence of adsorbents typically reduces the spin polarization, a clean environment and an inert tip material must generally be maintained. The most widely used STM tip material is tungsten wire. However, tungsten wire requires an extremely high annealing temperature (>2000° C.) to clean.

In one widely used STM tip carrier design, by Omicron Nanotechnology Corporation, the tungsten wire is mounted in a tip carrier that incorporates organic insulators and gold coatings which cannot stand such a high temperature.

In order to successfully flash a tungsten tip, a large temperature gradient (>1800° C.) is impressed across the millimeter-long tungsten wire. Dipolar interaction (Ref 1) between the magnetic tip and the sample due to the stray magnetic field should be as low as possible because it may modify or destroy the sample's intrinsic domain structure that is the subject of the investigation. To fulfill this requirement, the magnetic coating area must be localized to the sharp tip end (apex) of the tungsten wire.

The present invention is an easily removable STM tip treatment attachment for a scanning tunneling microscope that readily converts the STM to a spin polarization STM (SP-STM). The STM tip treatment device can not only provides the spin polarization function, but is capable of providing other functions as well, including flashing an STM tip to high temperature (>2000° C.) in an extremely localized fashion, general tip cleaning, and coating the tip apex with monolayers of coating materials.

REFERENCES

1. A. Kubetzka, M. Bode, O. Pietzsch, and R. Wiesendanger, "Spin-Polarized Scanning Tunneling Microscopy with Antiferromagnetic Probe Tips," *Phys. Rev. Lett.* Vol. 88, No. 5, Paper No. 057201, 4 pages, (2002).
2. O. Pietzsch, A. Kubetzka, M. Bode, and R. Wiesendanger, "Recent Advances in Spin-Polarized Scanning Tunneling Microscopy," *Appl. Phys.* A Vol. 78, pp. 781-785 (2004).

BRIEF SUMMARY OF THE INVENTION

In a preferred embodiment, the invention is a device for treating a scanning tunneling microscope (STM) tip, the STM including an STM tip affixed in the tip fixture of a tip carrier, the tip carrier homed in a tip transfer unit, and the tip transfer unit homed in a reception stage mounted on a manipulator head. In particular, the device comprises:

a high voltage spring contact in electrical contact with the tip fixture, the high voltage spring contact affixed to a contact block mounted on the tip transfer unit;

a high voltage contact bar mounted on the reception stage, the high voltage contact bar in electrical contact with the contact block;

a screening plate having an aperture, the screening plate mounted on the tip transfer unit such that the aperture is positioned directly over the apex of the STM tip; and a ring filament heater mounted on the reception stage with the ring portion of the ring filament heater positioned directly over the screening plate aperture, such that the ring portion of the ring filament heater, the screening plate aperture, and the apex of the STM tip are aligned on a common axis.

DETAILED DESCRIPTION OF THE INVENTION

Figure 1:
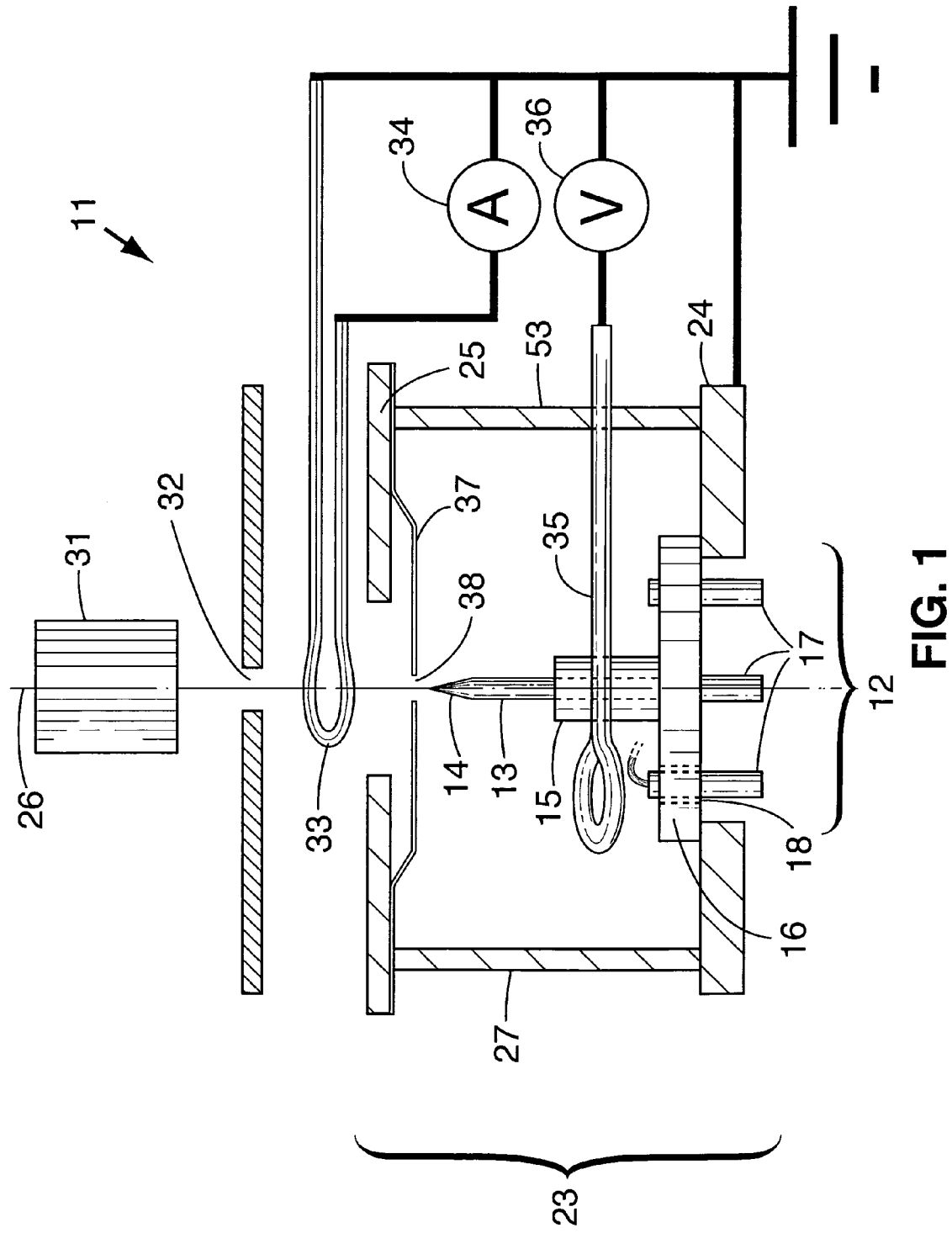
FIG. 1 is an illustration of the STM tip treatment device of the present invention.
Figure 2:
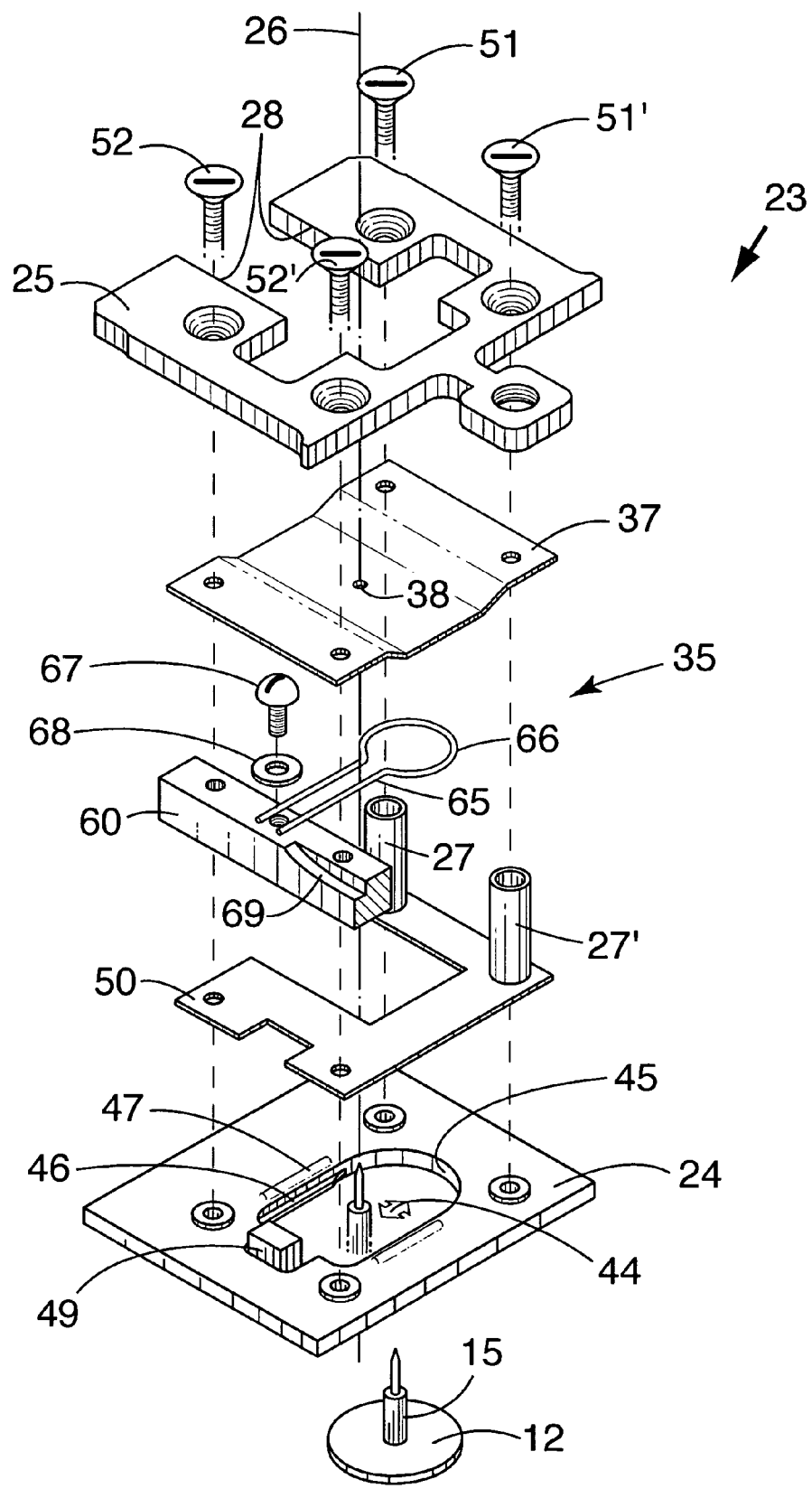
FIG. 2 is an exploded view of a modified tip transfer unit illustrating some parts of the STM tip treatment device mounted thereon.
Figure 3:
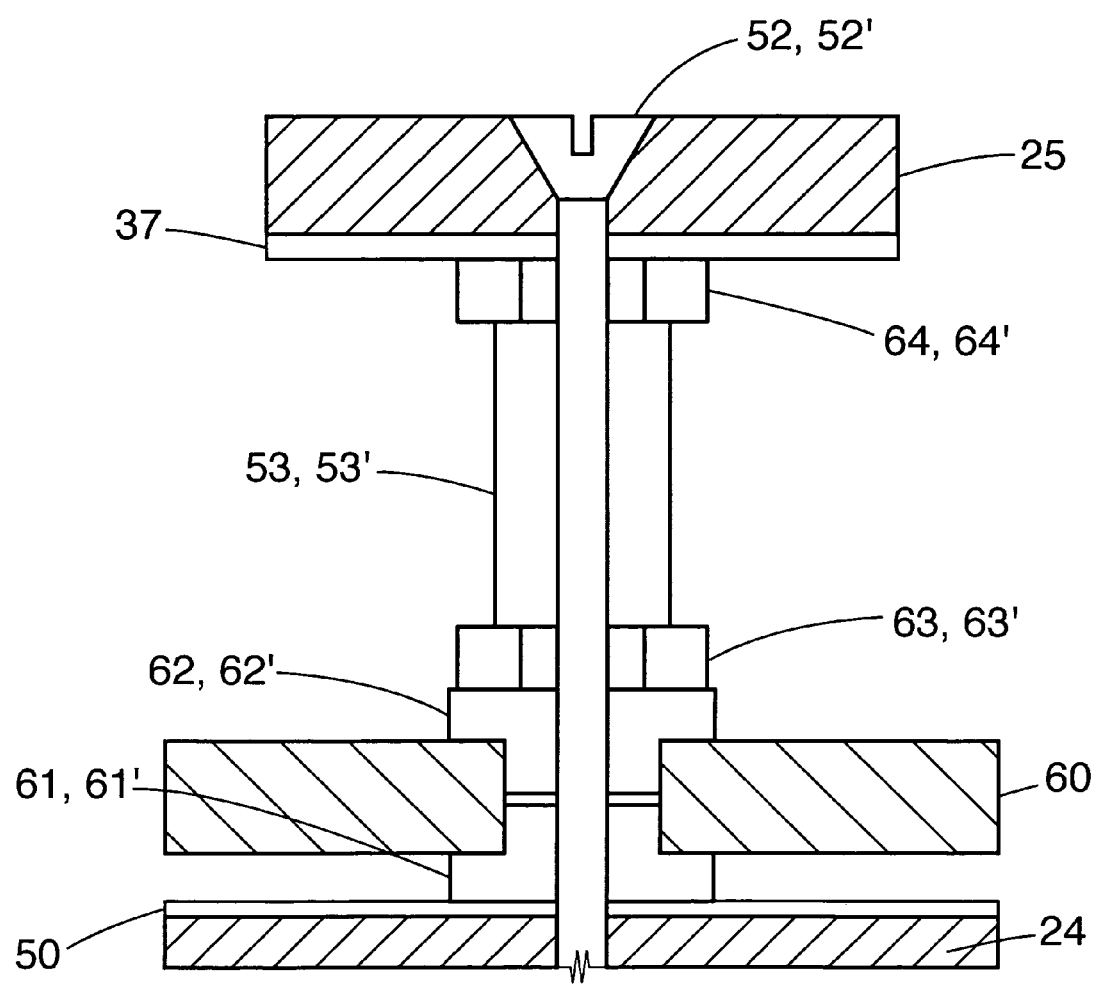
FIG. 3 shows the mounting of a high voltage contact block in the modified tip transfer unit of FIG. 2.
Figure 4:
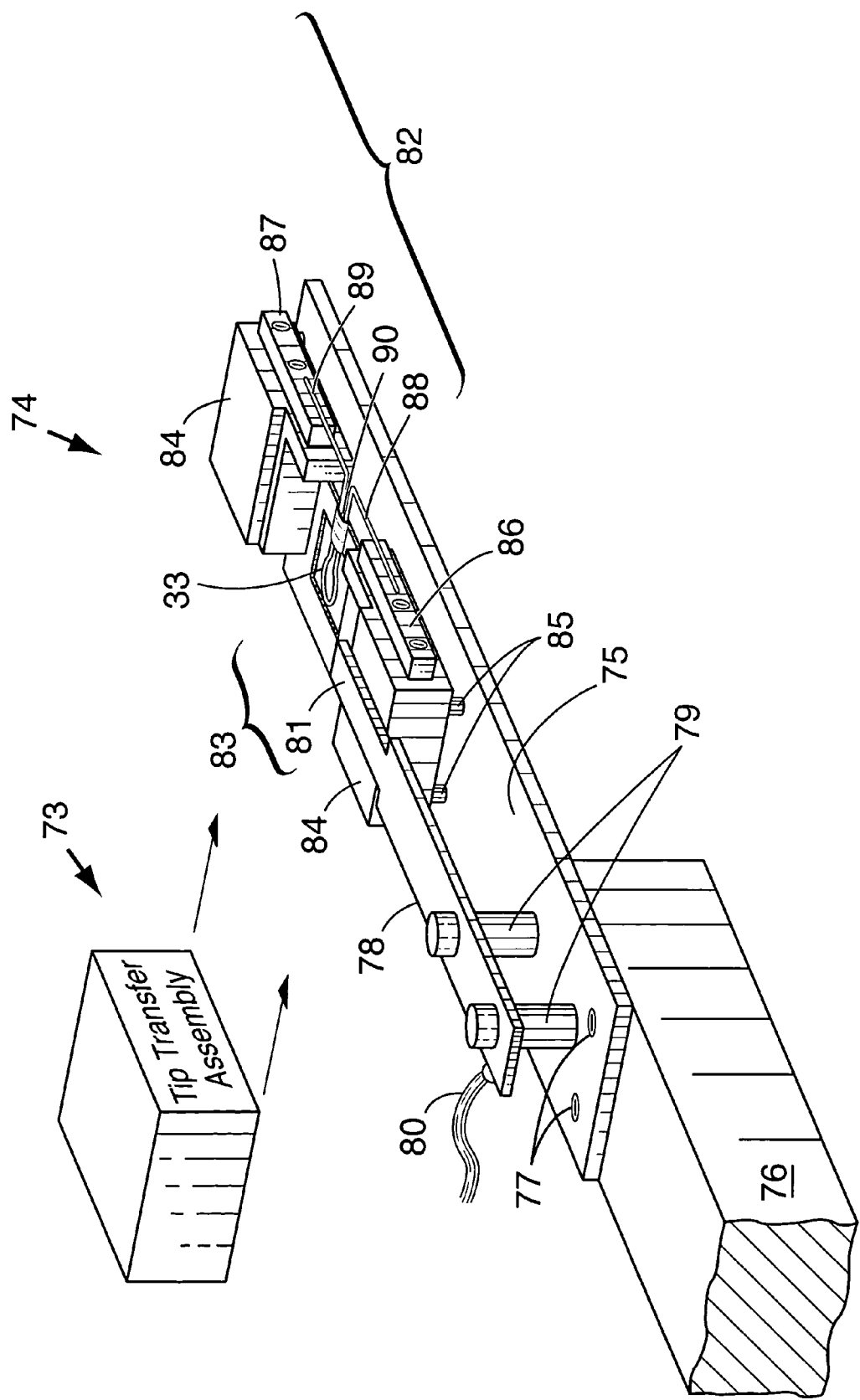
FIG. 4 shows other component parts of the STM tip treatment device mounted on an STM tip reception stage.

Referring to FIGS. 1-4, the invention is a tip treatment device 11 for use in an ultrahigh vacuum (UHV) in situ scanning tunneling microscope (STM). The device 11 comprises a modified tip transfer unit 23 (FIGS. 1-2) and a specially designed reception stage 74 that is mounted on a manipulator head 76 (FIG. 4). The reception stage 74 includes a receptor 82 that contains a receiver 83 for accepting a tip transfer assembly 73 in the usual manner (FIG. 4). The tip transfer assembly 73 comprises the modified tip transfer unit 23 with a standard STM tip carrier 12 therewithin (FIG. 1).

In FIG. 1, a standard tip carrier 12 is shown in its usual placement within a tip transfer unit 23. The tip carrier 12 normally comprises a base 16, tip fixture 15, tungsten wire 13 with its STM tip 14, electrical contact legs 17 and organic leg insulators 18. The tip carrier is coated with gold. The contact legs 17 are isolated electrically from the tip carrier 12 by means of the organic insulators 18 that cannot withstand high temperature. Typically, a tip carrier cannot be heated higher than 200° C. without damage to the insulators 18.

The problem has been that users who want to carry out standard STM functions as well as those who want spin polarization functionality must frequently clean the tip (apex) 14 of the tungsten wire 13 by heating it to a very high temperature, sometimes to more than 2000° C. In order to avoid permanent damage to the tip carrier 12 during such heating, the tip carrier base 16 has to be kept at a relatively low temperature. This has always been a difficult and critical undertaking. Many users have tried to anneal the tip 14 for the purpose of removing some absorbent from the tip. Such tip cleaning may require only 600° C., for example. But even for this low a tip temperature, users frequently overheat the tip carrier base 16 and compromise the insulators 18 in the base. When the insulators break down, the tip carrier 12 becomes useless, and a new one has to be obtained.

FIG. 1 further shows a base plate 24, upper plate 25, and support posts 27, 53 of a standard tip transfer unit 23. The STM tip treatment attachment of this invention modifies the standard tip transfer unit 23 to include a screening plate 37 and a high voltage spring contact 35. The screening plate 37 is constructed as a solid plate with a small aperture 38 located so as to be close to the wire apex 14 when the tip carrier 12 is placed (homed) in the tip transfer unit 23. The tip treatment device 11 also includes a ring filament heater 33 mounted in the reception stage 74. More particularly, referring to FIG. 4, the ring filament heater 33 is mounted in the receiver portion 83 of the receptor 82 on the reception stage 74. The ring heater 33 is mounted in the receiver 83 such that when the tip transfer assembly 73 is properly inserted (homed) in the receiver 83 (FIG. 4), the ring portion of heater 33, the screening plate aperture 38, and the wire tip 14 are aligned on a common axis 26 as shown in FIGS. 1 and 2. The ring filament heater 33 is useful for electron bombardment heating of the STM tip 14 and for a number of other uses.

FIG. 2 shows the high voltage spring contact 35 in more detail. In FIG. 2, the high voltage spring contact 35 is a spring metal having two prong portions 65, with a loop portion 66 connecting the two prong portions. Also in FIG. 2, the high voltage spring contact 35 is mounted on and electrically connected to a contact block 60 by a machine screw 67 and washer 68. A portion 69 of the contact block 60 is wedge-shaped for the purpose of establishing an electrical connection with a high voltage contact bar 78 (FIG. 4) when the tip transfer assembly 73 is moved into the receiver 83 of the reception stage 74.

In FIG. 2, the tip carrier 12 is inserted into the opening 45 in the lower plate 24, under the orientation lock plate 50. It is then moved along the inward projecting support ledges 46 and guide rails 47 (see arrow 44 in FIG. 2) with the guidance of the magnet 49 to its locked (home) position against magnet 49, as is known. As this movement takes place, the tip fixture 15 enters the loop portion 66 of the high voltage spring contact 35, and then slides between the two prongs 65, establishing an electrical connection between the cylindrical tip fixture 15 and the two prongs 65 when the tip carrier 12 is fully homed against the magnet 49. The construction is such that when the tip carrier 12 is firmly in place against the magnet 49, the apex 14 of the tip wire 13 will be aligned on the axis 26.

FIG. 3 shows the mounting of the contact block 60 in the tip transfer unit 23 in further detail. In FIG. 3, the lower plate 24, orientation lock plate 50, insulator support posts 53, 53', and upper plate 25 are shown in their usual placement on the machine screws 52, 52'. The contact block 60 is held in place by insulators 61, 61' and 62, 62'. The nuts 63, 63' and 64, 64' secure the assembly. FIG. 3 also shows the attachment of the screening plate 37 directly beneath the upper plate 25.

Referring to FIGS. 1, 2, the small aperture 38 in the grounded screening plate 37 is located directly above the STM tip 14. This allows exposure of only the STM tip 14 to the electrons emitted from the ring filament heater 33. The grounded screening plate 37 is useful for other functions as well. For example, an evaporation source 31 and evaporation source aperture 32 (FIG. 1) may be installed along the axis 26 above the screening plate 37. This allows applications such as coating of the STM tip 14 without exposing the tip carrier base 16 to the incoming flux. The screening plate 37 thus makes possible a built-in heat confinement function around the STM tip 14, and also a localized tip coating function. Additional functions are made possible by the tip treatment device as will be described later.

FIG. 4 shows the reception stage 74 that receives the tip transfer assembly 73. The reception stage 74 is mounted on the manipulator head 76 using machine screws 77. The reception stage 74 includes a high voltage contact bar 78 in addition to the receptor 82 with its receiver 83. In further detail, the receptor 82 is built on the reception stage base 75. The receptor 82 is a stainless steel structure 84 supported on insulating legs 85. The structure 84 incorporates the receiver 83. The structure 84 is also designed to hold the ring filament heater 33, which is rigidly affixed to the structure 84 by means of filament connecting blocks 86, 87, filament connecting leads 88, 89, and filament fixture 90.

Also in FIG. 4, the high voltage contact bar 78 is affixed to the base 75 by insulating legs 79, and is further supported at one end (the contact end 81) on the structure 84, but is electrically insulated from the structure 84. A high voltage connecting wire 80 attached to the contact bar 78 is used to supply a high voltage to the contact block 60 through the contact end 81 of the contact bar 78.

The manner of applying high voltage to the STM tip 14 during electron bombardment heating will now be described. It will be recalled that when the tip carrier 12 is inserted into the tip transfer unit 23 and homed, the tip fixture 15 will be in electrical contact with the high voltage spring contact 35. In FIG. 4, as the tip transfer assembly 73 is inserted into the receiver 83, the contact bar 78 on the reception stage 74 makes electrical contact with the wedge portion 69 of the contact block 60. This design allows application of high voltage only to the STM tip 14 by means of the high voltage connecting wire 80 while keeping the tip transfer unit 23 and the tip carrier base 16 grounded. FIG. 2 shows that a portion 28 of one side of the upper plate 25 has been cut away to make room for the ring heater filament 33.

Referring to FIG. 1, a tungsten wire (0.007-inch diameter) with thoria coating may be used as the ring filament heater 33. The tungsten filament 33 allows a current flow of 3.5 A. A high voltage of about 1000 V from a voltage source 36 is applied between the filament 33 and the STM tip 14. The STM tip 14 is positively biased so as to draw electrons from the filament 33 for heating of the tungsten tip. The filament 33 is positioned so the STM tip 14 will locate at the focus center of the filament heater ring 33 when the tip transfer assembly 73 is engaged in the receiver portion 83 of receptor 82.

In operation, a current from a DC power supply 34 is applied to heat the filament heater 33, and then a voltage from the high voltage source 36 is applied to the tip fixture 15. The role of the screening plate 37 is critical whenever the tip 14 is cleaned, flashed, coated, or spin-polarized. The screening plate 37 protects the rest of the tip carrier 12 from the heating effects of the filament 33. Without the screening plate 37, electrons from the filament 33 can go everywhere; to the tip 14, to the whole of the tip carrier 12, and to the contact legs 17. The screening plate 37 is thus very important because it localizes the heating effect, and prevents the electrons from bombarding anything but the tip 14. The screening plate 37 also protects these structural parts from being coated with iron or other magnetic materials that are put on the tip 14.

Some of the major functions needed for STM tips are tip preparation, tip spin polarization, tip cleaning, tip flashing, and tip coating. All of these functions can be carried out by employing the STM tip treatment attachment 11 in existing STM systems.

Tip preparation. An in situ preparation of magnetic thin film tips (Ref. 2) for SP-STM consists of the following preparation steps: Electrochemically etch a polycrystalline tungsten wire in a saturated solution of NaOH in distilled water. The etching procedure produces tips with a typical apex radius of 20-50 nm. Next, heat the tungsten tip to 2000° C. upon introduction into the UHV chamber. This step has been found to be very important for cleaning the tip and epitaxially coating the tip with magnetic monolayers. Lastly, epitaxially coat the tip with a magnetic film to a thickness of several monolayers.

Tip spin polarization. The orientation of the tip magnetization may be manipulated using the following steps: Adjust the magnetization direction by the choice of the coating material and coating thickness in monolayers (ML). For example: Gd (7-9 ML), GdFe (10-15 ML) and Cr (25-45 ML) usually provide a magnetization along the tip axis, i.e., perpendicular to the sample plane at low temperature. On the other hand, a Fe (3-10 ML) coating results in a tip magnetization parallel to the sample plane (Refs 1, 2). The magnetization direction may be switched using an external magnetic field as is known in the field.

Figure 5:
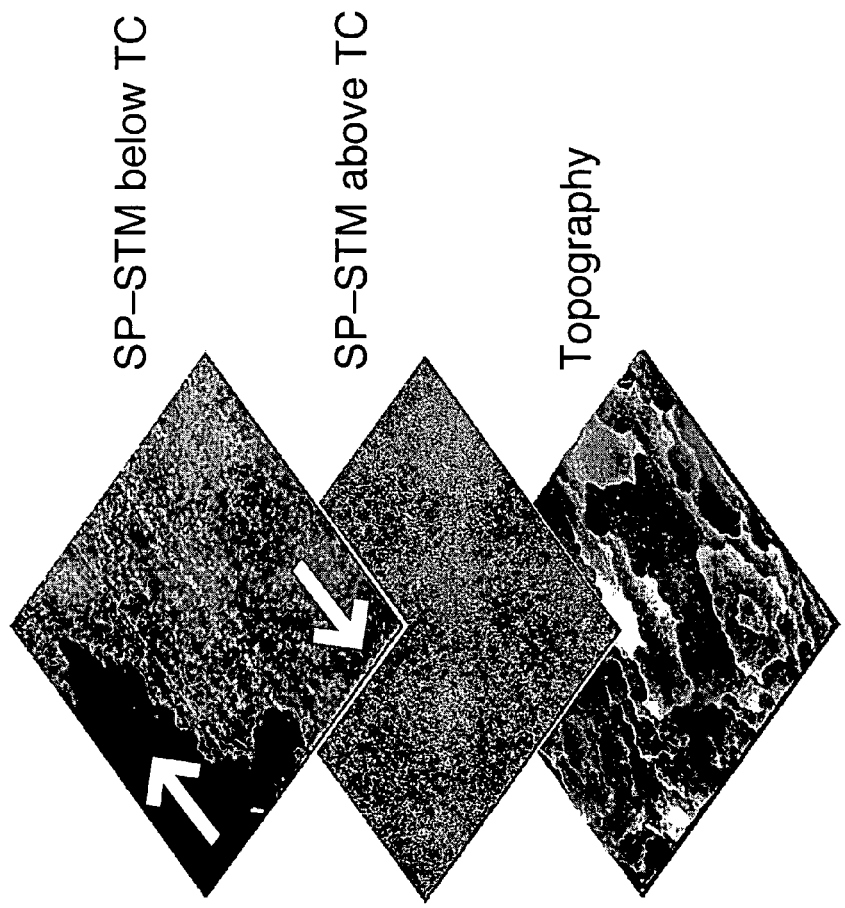
FIG. 5 is a photomicrograph showing the magnetic domain present in the surface of a sample material as revealed by the STM tip treatment device.

FIG. 5 is a photomicrograph showing the magnetic domain present in the surface of a sample material as revealed by the STM tip treatment device. The bottom graph shows a topographic image of an iron film deposited on a copper substrate. It was taken with a tungsten tip and a standard STM system without the spin polarization function. The top and middle images show the dependence of magnetic domain structures on temperature. They were taken using an iron-coated magnetic tip and a standard STM system with a spin polarization function. When the temperature is lower than the Curie temperature (Tc) of the iron film (top image), bright and dark contrasts are revealed which correspond to two magnetic domains with opposite spin orientations as shown by the two arrows in the top image. When the temperature is above the Tc, the magnetic domain contrast disappears because the magnetic domain structures no longer exist at high temperatures.

Tip cleaning. The following steps may be used for UHV in situ STM tip cleaning: Mount an STM tip carrier in a tip transfer unit. This step can be done in UHV on the STM scanner stage using the coarse motion drive. Next, insert the tip transfer assembly into the receiver with the UHV wobble stick. In this step, the tip transfer assembly must be fully homed so that the STM tip is located on the centerline of the ring portion of the filament heater, and the contact end of the contact bar on the reception stage is engaged with the contact block on the tip transfer unit. A current of less than 3.5 A is then applied to the filament heater using the DC power supply. Lastly, flash the STM tip by applying high voltage (~1000 V) to the STM tip. The tip temperature is monitored with an infrared pyrometer or by controlling the emission current of the filament. The high temperature tip flash is confined to the apex of the tip wire, and the other end of the wire, which is held in the tip fixture, is kept at much lower temperature. The tip treatment device thus achieves a controlled large temperature gradient across the tip wire, which enables cleaning of the tip sharp end while leaving the other tip carrier components unaffected. The tip treatment attachment can be used for general tip cleaning processes in most if not all STM systems.

Tip flashing. Tip flashing, described above, is the process of going to high temperature quickly for a very short period of time. Flashing burns off unwanted materials from the STM tip.

Tip coating. The following steps for UHV in situ STM tip coating may be carried out with the tip treatment device: Flash the STM tip at the required temperature. Then align the tip to an evaporation source using an UHV manipulator. Lastly, evaporate the coating material on the STM tip to the controlled thickness.

By changing the STM tip material and controlling the tip treatment process, scanning probes with special crystalline facets and special crystallographic orientations can also be prepared using this tip treatment device.

The invention claimed is:

1. A device for treating a scanning tunneling microscope (STM) tip, the STM including an STM tip affixed in the tip fixture of a tip transfer, the tip carrier homed in a tip transfer unit, and the tip transfer unit homed in a reception stage mounted on a manipulator head, the device comprising:

a high voltage spring contact in electrical contact with the tip fixture, said high voltage spring contact affixed to a contact block mounted on the tip transfer unit;

a high voltage contact bar mounted on the reception stage, said high voltage contact bar in electrical contact with said contact block;

a screening plate having an aperture, said screening plate mounted on the tip transfer unit such that said aperture is positioned directly over the apex of the STM tip; and a ring filament heater mounted on the reception stage with the ring portion of said ring filament heater positioned directly over said screening plate aperture, such that said ring portion of said ring filament heater, said screening plate aperture, and the apex of the STM tip are aligned on a common axis.

2. The device of claim 1 further including a DC power supply for providing an electrical current to said ring filament heater, the device also including a voltage source connected to said high voltage contact bar for providing a high voltage to the STM tip by means of said contact block and said high voltage spring contact.

3. The device of claim 1 further comprising an evaporation source positioned along said common axis.

* * * * *